(12) United States Patent
Middleton (10) Patent No.: US 11,553,653 B2
(45) Date of Patent: Jan. 17, 2023

(54) PLANT POT

(71) Applicant: Rodney James Middleton, Tenterfield (AU)

(72) Inventor: Rodney James Middleton, Tenterfield (AU)

(*) Notice: Subject to any disclaimer, the term of this patent is extended or adjusted under 35 U.S.C. 154(b) by 207 days.

(21) Appl. No.: 16/314,993

(22) PCT Filed: Jul. 4, 2017

(86) PCT No.: PCT/AU2017/050690
§ 371 (c)(1),
(2) Date: Jan. 3, 2019

(87) PCT Pub. No.: WO2018/006123
PCT Pub. Date: Jan. 11, 2018

(65) Prior Publication Data
US 2019/0200538 A1      Jul. 4, 2019

(30) Foreign Application Priority Data

Jul. 8, 2016   (AU) .................... 2016902691

(51) Int. Cl.
*A01G 9/02*          (2018.01)

(52) U.S. Cl.
CPC ............. *A01G 9/028* (2013.01); *A01G 9/021* (2013.01)

(58) Field of Classification Search
CPC ........ A01G 9/028; A01G 9/021; A01G 9/247; A01G 27/06; A01G 9/022; A01G 9/023; A01K 7/005
See application file for complete search history.

(56) References Cited

U.S. PATENT DOCUMENTS

| | | | | |
|---|---|---|---|---|
| 3,800,469 A | * | 4/1974 | Lau, Jr ................... | A01G 9/021 47/65.5 |
| 5,042,197 A | * | 8/1991 | Pope ........................ | A01G 9/02 47/79 |
| 5,459,960 A | * | 10/1995 | Manlove ............... | A01G 24/60 47/65.5 |
| 6,550,630 B1 | * | 4/2003 | Krupa .................... | B65D 85/72 220/675 |
| 8,065,834 B2 | * | 11/2011 | Eckert .................... | A01G 27/02 47/66.1 |
| 2013/0133255 A1 | * | 5/2013 | Wu ......................... | A01G 27/02 47/66.1 |
| 2018/0279561 A1 | * | 10/2018 | Kidder ................... | A01G 9/028 |

FOREIGN PATENT DOCUMENTS

| CN | 201789810 U | * | 4/2011 | .............. A01G 9/02 |
|---|---|---|---|---|
| GB | 2139465 A | * | 11/1984 | ............. A01G 27/00 |
| KR | 200451153 Y1 | * | 11/2010 | ............. A01G 27/04 |

* cited by examiner

*Primary Examiner* — Monica L Perry
*Assistant Examiner* — Brittany A Lowery
(74) *Attorney, Agent, or Firm* — Head, Johnson, Kachigian & Wilkinson, PC (57) ABSTRACT

A plant pot comprising a first reservoir, in which the first reservoir has a base and at least one first side wall extending upwardly from an outer periphery of the base. The plant pot further comprising at least one second side wall formed in the first reservoir extending upwardly from the base. The at least one second side wall forming a second reservoir in the first reservoir, and wherein the second reservoir is integrally formed from the base of the first reservoir.

15 Claims, 8 Drawing Sheets

PLANT POT

TECHNICAL FIELD

The present invention relates to an improved plant pot. More particularly, the present disclosure relates to a plant pot with multiple reservoirs.

BACKGROUND

Plant pots are typically used to retain a plant in a residential or business environment. Plant pots allow a plant to grow within environments which typically would not be able to grow. However, there are a number of problems with pot plants, typically that they only imitate limited aspects of a natural environment.

Plant pots typically comprise a base and one or more side walls that extend upwardly from said base and whereby said base in conjunction with said side wall or walls define an open topped receptacle that is capable of receiving a plant base medium, such as soil, sand, humus, mulch or a mixture of two or more of the aforementioned materials. The side wall or walls generally diverge outwardly away from the base thereby assisting the removal of the plant and the plant base medium from the pot with minimal disturbance to the plant's root system and also permitting the pot and other similarly shaped pots to nest within one another.

Plant pots also typically include at least one drainage aperture consisting of an opening formed in the side wall and extending upwardly from the base, and which may be cognate with an opening formed in said base. Typically plant pots include a plurality of such apertures spaced equally around the periphery of the pot's base.

Potted plants typically require frequent watering if the plant is to survive. However, the pots described above are themselves not designed to retain water and whereby the plant is reliant upon the ability of the plant base medium and the manner by which it is packed within the pot to trap and/or otherwise retain sufficient water long enough for it to be absorbed by the plant's roots. For example, in practice, a plant base medium that contains gravel might retain less water than a plant base medium that contains humus.

Regardless of the type of plant base medium that is used to support a plant, or the manner by which the plant base medium is arranged within the pot, it has been observed that often water applied to the exposed upper surface of the plant base medium will over a relatively short period of time descend though the plant base medium and exit the pot via the aforementioned drainage apertures. Further, it has been observed that often very little of the water is retained by the plant base medium to be taken up by the plant's root system.

It has also been observed that the drainage apertures contribute to a general drying out of the plant based medium adjacent the base of the pot. Unfortunately this situation does not encourage growth of the plant's root system and can cause the lowest extending roots considerable stress.

Further it has been observed that the generally downward flow of water through the plant base medium tends to carry with it nutrients that are present, or have been added, to the plant base medium and that these nutrients are lost due to the exodus of water though the drainage apertures.

Moreover, when a conventional plant pot is watered it is not always possible to be assured all of the plant base medium has been thoroughly wetted, in most cases it is not, even after continuous irrigation, and correct moisture levels overall are very difficult and time consuming to ascertain. This is a serious problem to horticulturalists and home growers alike. Much water is wasted attempting to ensure thorough wetting of the plant base medium within conventional plant pots and many times pockets of plant base medium lacking moisture remain unnoticed until the plant has suffered dramatically.

Of course many designers of prior art plant pots of the self-watering type have attempted to resolve some of the problems associated with full draining types however other problems have ensued. Some of these problems for example are, bulky and non-stackable separate water storage receptacles, and elaborate and complicated expensive multi-part systems. All of these types slosh and spill when transported or are moved, are prone to stagnation, algae growth, insect infestation (for example, mosquito larvae) and loss of capillary action due to disassociation between material and water supply, i.e. failure of wicking.

As a consequence of the aforementioned deficiencies in the general design of plant pots it is believed that a significant amount of the water applied to the plant base medium through watering activities is wasted as too are vital nutrients. Further, because a significant amount of water is lost almost immediately through the drainage apertures, the potted plants must be watered more frequently, and in some instances more than once a day, in order to keep the tips of the lowest extending roots moist, adding further effort/maintenance and contributing to further leeching of nutrients.

Further, it has also been observed that some water and plant base medium may be lost from the pot via the drainage apertures. Often this is not desirable, particularly during transportation, as it may contribute to an unsightly mess around the base of the pot and may present hazards. Leakage from the plant pots may cause problems for transports, threaten the fouling of accompanying transported materials, goods and products.

For example, in order to contain or limit the egress the aforementioned mess some previous plant pot designs or configurations are sold with a saucer that is designed to receive and temporarily store any water that passes through the pot's drainage apertures, as well as any plant base medium carried along with the water.

In a natural environment the soil beneath the surface may retain water and nutrients for a long period of time, moisture and nutrient levels are more constant, than a plant base medium that is housed within a conventional plant pot.

Further, it has also been observed that conventional plant pots with down-turned rim or skirt may not aid the holding capacity of the plant pot and that the down-turned rim or skirt may provide a haven for spiders and other dangerous insects. Moreover, the down-turned rim or skirt may be awkward or difficult to lift. This is generally not desirable, when an operator is lifting the plant pot on the edge of the rim, which may be weak and can crack, split, cut or pinch the operator's hands.

Any discussion of the prior art throughout the specification should in no way be considered as an admission that such prior art is widely known or forms part of common general knowledge in the field.

SUMMARY

Problems to be Solved

It may be advantageous to provide a pot that retains fluid sufficiently long enough to allow for the plant's root system to absorb at least a portion of fluid.

It may be an advantage to provide a plant pot which requires less fluid to be used to maintain a desirable level of fluid in a plant pot.

It may be an advantage to provide a plant pot with an up-turned rim.

It may be an advantage to provide a plant pot which reduces the locations for pest or insects to be obscured from view.

It may be an advantage to provide a plant pot with an up-turned rim for facilitating movement of the plant pot.

It may be an advantage to provide a plant pot which provides a relatively more natural environment for a plant to reside.

It is an object of the present invention to overcome or ameliorate at least one of the disadvantages of the prior art, or to provide a useful alternative.

Means for Solving the Problem

In a first aspect of the present invention, a plant pot is provided wherein the plant pot may comprise: a first reservoir having a base; at least one first side wall extending upwardly from an outer periphery of the base; at least one second side wall formed in the first reservoir extending upwardly from the base; the at least one second side wall forming a second reservoir in the first reservoir; and wherein the second reservoir is integrally formed from the base of the first reservoir, wherein a buffer region is provided between the first side wall and second side wall such that the second reservoir is spaced away from contact with an open air environment; wherein the side wall of the second reservoir is concave to allow for the retention of fluids, and wherein the at least one second reservoir side wall forms a hollow region on the underside of the plant pot thereby permitting a second plant pot to fit above the hollow region with the second reservoir side wall of the second plant pot stacked on the second reservoir side wall of the plant pot.

Preferably, at least one first side wall of the plant pot is stepped. Also, the at least one second side wall may be equal in height to at least one step in the at least one first side wall.

Preferably, the plant pot further may comprise at least one drainage means. The at least one first side wall may comprise at least one flange above the at least one drainage means. At least one flange may extend from the at least one first side wall in a direction towards the at least one second side wall.

Preferably, the at least one first side wall comprises a rim portion. The rim portion may comprise a projection which projects relatively upwardly. The at least one second side wall may be formed by at least one deformation of the base. The at least one deformation may be generally sinusoidal in profile.

In a second aspect of the present invention, a plant pot is provided wherein the plant pot may comprise: a first reservoir having a base; at least one first side wall extending upwardly from an outer periphery of the base; in which the at least one first side wall is stepped; at least one second side wall formed in the first reservoir extending upwardly from the base; the at least one second side wall forming a second reservoir in the first reservoir; and wherein the second reservoir is integrally formed from the base of the first reservoir, in which the height of the second side wall is equal in height to a step of the stepped at least one first side wall, wherein a buffer region is provided between the first side wall and second side wall such that the second reservoir is spaced away from contact with an open air environment; wherein the side wall of the second reservoir is concave to allow for the retention of fluids; and wherein the at least one second reservoir side wall forms a hollow region on the underside of the plant pot thereby permitting a second plant pot to fit above the hollow region with the second reservoir side wall of the second plant pot stacked on the second reservoir side wall of the plant pot.

The at least one first side wall further may comprise a rim portion. Preferably, the rim may project relatively outwardly from the at least one first side wall. A first reservoir drainage means may be formed in the first reservoir. A second reservoir drainage means may be formed in the second reservoir.

Preferably, at least one of the first reservoir drainage means and the second reservoir drainage means may be adapted to be plugged. At least one second side wall may be formed by deformation of the base.

In the context of the present invention, the words "comprise", "comprising" and the like are to be construed in their inclusive, as opposed to their exclusive, sense, that is in the sense of "including, but not limited to".

The invention is to be interpreted with reference to the at least one of the technical problems described or affiliated with the background art. The present aims to solve or ameliorate at least one of the technical problems and this may result in one or more advantageous effects as defined by this specification and described in detail with reference to the preferred embodiments of the present invention.

DESCRIPTION OF THE INVENTION

Preferred embodiments of the invention will now be described with reference to the accompanying drawings and non-limiting examples. A first preferred embodiment of the present invention is depicted in FIGS. 1 to 7. A second preferred embodiment of the present invention is depicted in FIGS. 8 to 14.

Figure 1:
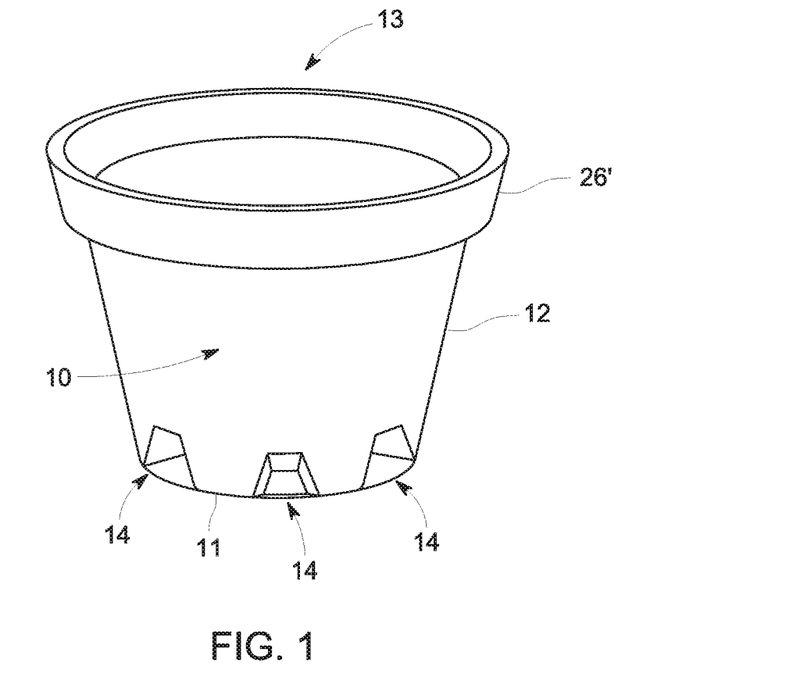
FIG. 1 illustrates a perspective view of a first preferred embodiment of the present invention.

FIG. 1 depicts a first preferred embodiment of the present invention wherein a plant pot 10 is provided. The plant pot 10 includes a base 11 and a side wall 12 extending upwardly from the base 11. The side wall 12 is preferably flared such that a plant may be removed from the plant pot 10 without significant damage to the root structure. The base 11 in combination with the side wall 12 defines an open topped container or first reservoir 13. The first reservoir may be referred to herein as a receptacle. The plant pot 10 preferably further comprises a plurality of drainage apertures 14 which allow for drainage of fluids from the plant pot 10. The drainage apertures may be formed in at least one of the side wall 12 and the base 11 of the plant pot 10. The drainage apertures 14 may extend upwardly from the base 11.

Figure 2:
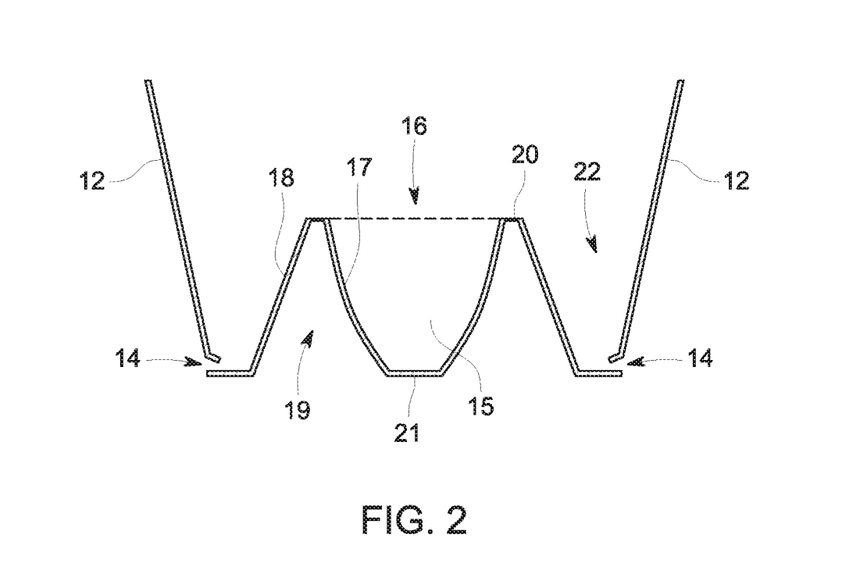
FIG. 2 illustrates a cross sectional side view of a further first preferred embodiment of the present invention.

FIG. 2 shows the second reservoir 15 disposed in a first reservoir 13 of the plant pot 10. The second reservoir 15 may be formed by an upward extrusion or moulding of a circular formation, or second reservoir wall 17, inside the plant pot first reservoir 13. The second reservoir wall 17 may be formed as a double wall structure, comprising an inner wall 17a and an outer wall 18. Preferably, a buffer region 22 is provided between the first side wall 12 and the second side wall 17 (or 18 for a double walled second side wall).

Figure 3:
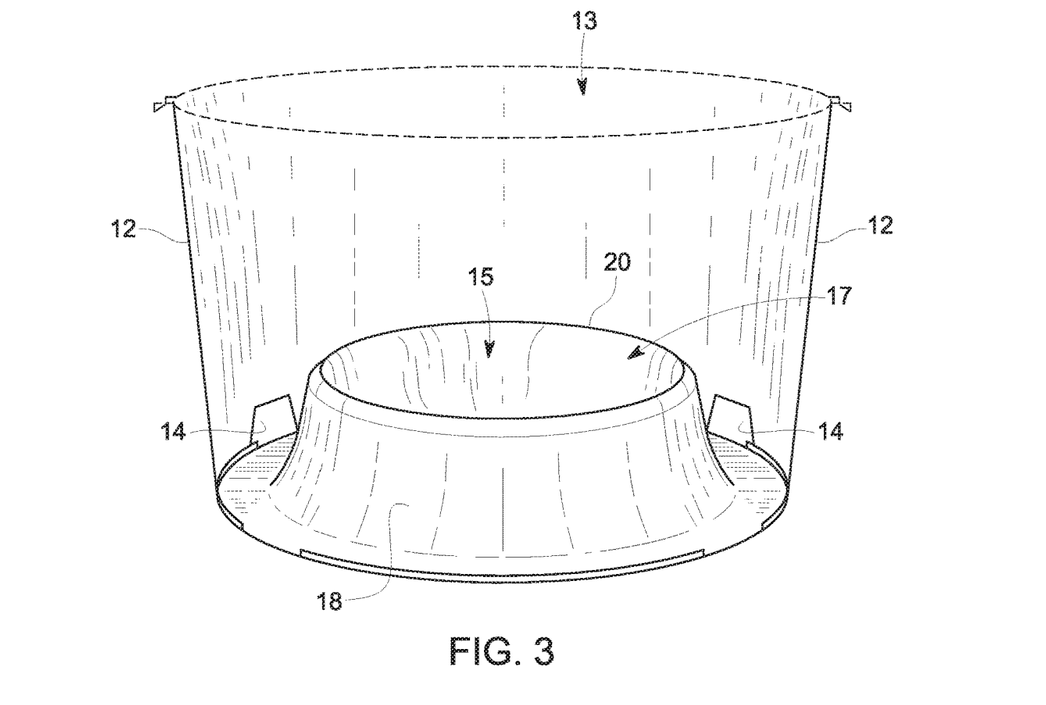
FIG. 3 illustrates a perspective transparent side view of the first embodiment.

As illustrated in FIG. 3, the side wall 17 of the second reservoir 15 may be a crater or bowl shape which allows for retention of fluids. If the second reservoir wall 17 is a double wall structure with inner wall 17a, and outer wall 18, void 19 or hollow region preferably exists between the inner wall 17a and the outer wall 18.

Figure 4:
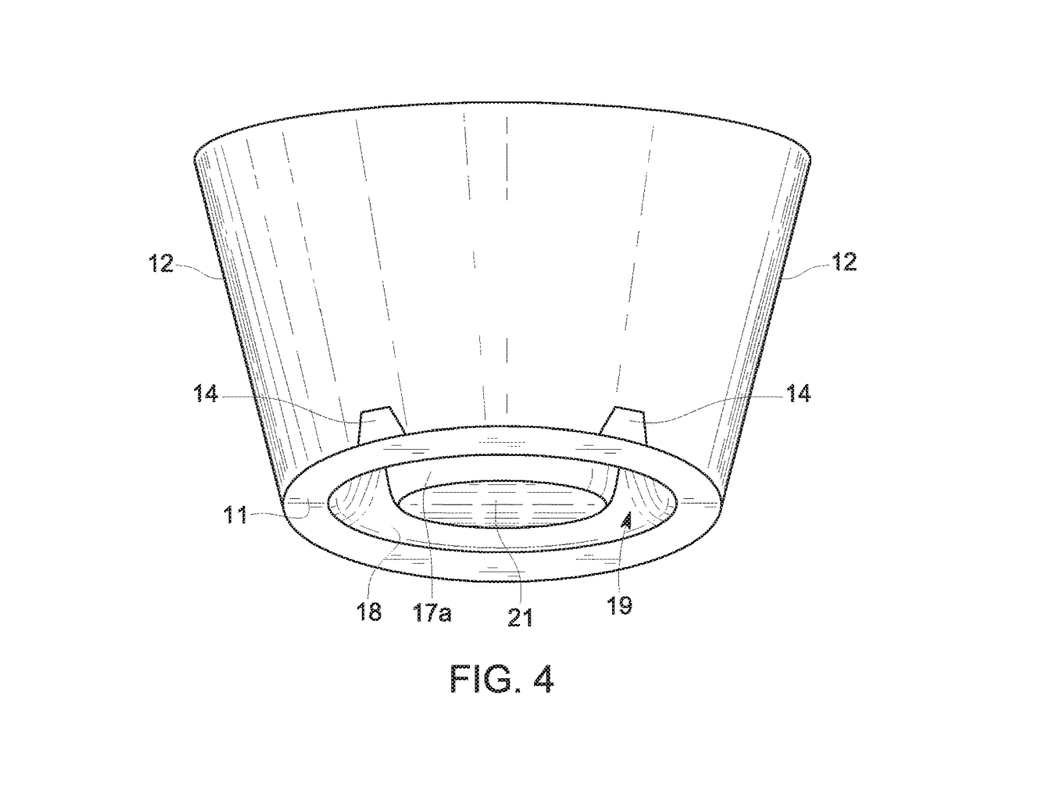
FIG. 4 illustrates a bottom perspective view of the first embodiment.

As illustrated in FIG. 4, the hollow region or void 19 may be accessible on the underside of the plant pot. Preferably, a buffer region 22 is provided between the first side wall 12 and the second side wall 17 (or 18 for a double walled second side wall).

Figure 5:
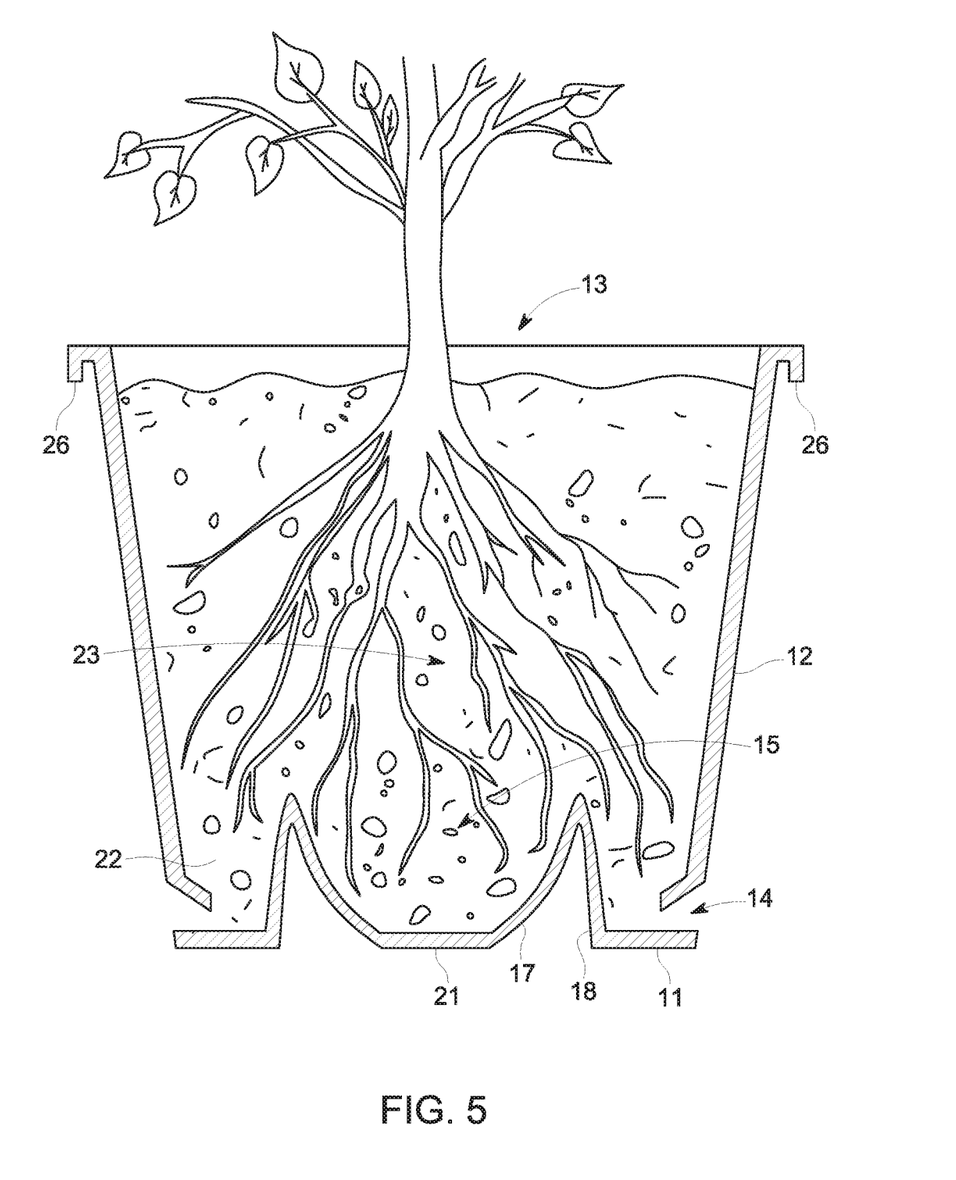
FIG. 5 illustrates a cross sectional side view of the first embodiment wherein the preferred embodiment is in use.

As illustrated in FIG. 5, the first reservoir 13 may be at least partially filled with a suitable plant growth medium, such as soil, sand, humus, mulch or a mixture of two or more of the aforementioned materials, such that a plant having a root system may propagate therein. The root structure of the plant will preferably extend generally downward in the direction of base 11 and the second reservoir base 21 to access fluids and nutrients.

Fluid, such as water or growth fluids, applied to the exposed upper surface of the plant growth medium near to the rim 26 of the plant pot 10 will generally, flow downwardly through the growth medium and settle in the reservoir 15 and 13. Excess fluid may continue downwards and pass through the drainage apertures 14 if the fluid is not directed to the second reservoir 15, or if the second reservoir is at, or near to, capacity.

In a further embodiment, the fluid that settles in the second reservoir 15 will be retained therein and will saturate the plant medium until it reaches the upper level limit 16 (see FIG. 2) at which point excess fluid may pass over the apex 20 of the second reservoir 15 to be eventually be passed out via the drainage apertures 14 if not consumed by a plant.

The fluid collected in the second reservoir 15 may provide an ongoing resource of fluid that may be absorbed by the root structure of the plant and may also provide a store of available fluid to permeate upwards to the higher levels of the plant pot over time.

The second reservoir 15 may retain a plant root structure and/or plant medium which is at least partially protected from the open air. Direct contact with the open air may introduce undesirable airborne bacteria, insects, chemicals and sunlight to the potted environment, for example; bacteria may encourage development of algae and stagnation of fluid, thriving of insects/mosquitos, and disease and viruses.

Figure 13:
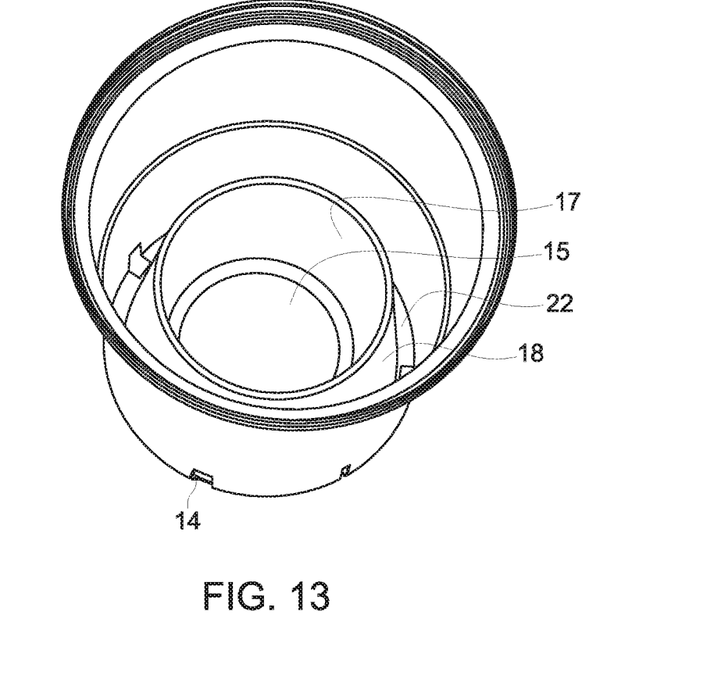
FIG. 13 illustrates a top perspective view of of the second preferred embodiment.
Figure 14:
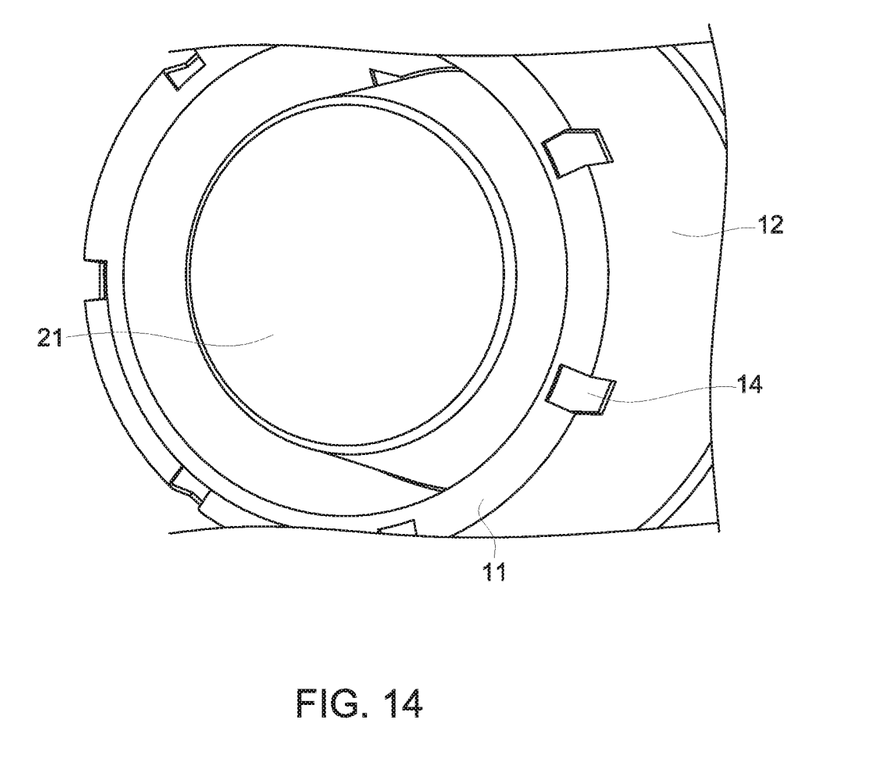
FIG. 14 illustrates a region of bottom perspective view of the second preferred embodiment.

The protection of the root structure and/or material in the reservoir 15 may be created by the buffer region 22. The buffer region 22 and the plant based medium may provide a filtering effect which may reduce the potential for bacteria and insects to locate a root structure. Further, as the second reservoir 15 is spaced away from the drainage apertures 14 as illustrated in FIG. 13, direct contact of the root structure or saturated material in the second reservoir 15 with an open air environment may be prevented.

Figure 6:
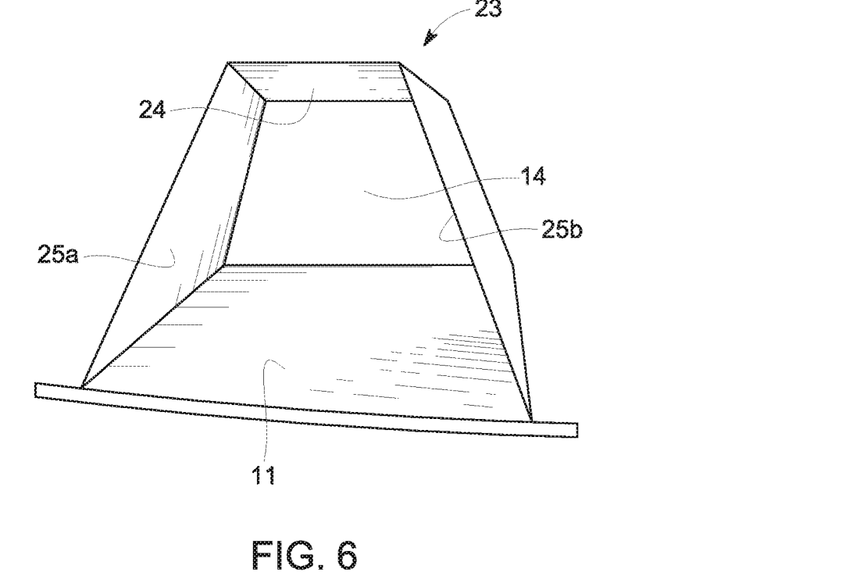
FIG. 6 illustrates an enlarged perspective view of a selected region of the first preferred embodiment.
Figure 7:
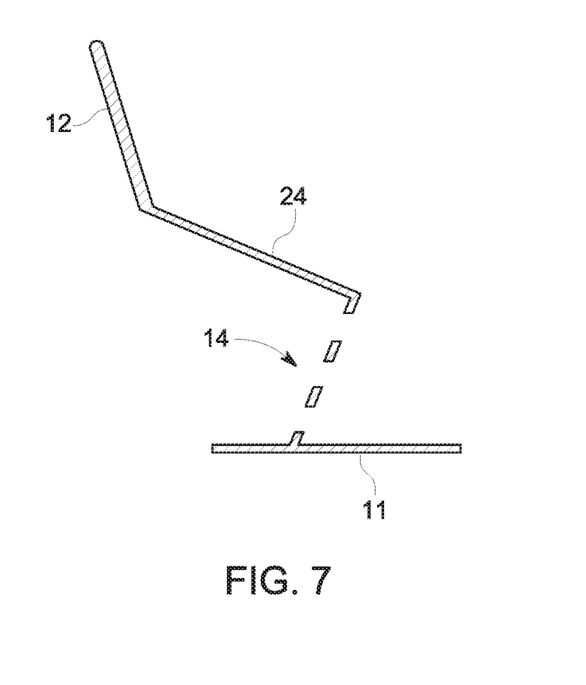
FIG. 7 illustrates an enlarged cross sectional side view of the first preferred embodiment of the drainage aperture as depicted in FIG. 6.

In yet a further embodiment, the drainage apertures 14 of the plant pot 10 may be spaced generally equally around the periphery of the plant pot 10. The drainage apertures 14 are preferably formed as any predetermined regular shape, such as a circle, triangle, square, or trapezoid for example. The drainage apertures 14 may be in communication with a passage 23 as shown in FIGS. 6 and 7. The passage may have passage side walls 25a, 25b, a passage roof 24 and a passage base, which is preferably the base 11. The passage may alternatively be a flange 24 positioned above, or overhanging, a drainage aperture 14.

Providing a drainage passage 23 may reduce plant base medium in the first reservoir from being expelled out of the receptacle and may prevent the loss of plant based medium that is often carried away with water simultaneously in drainage in conventional pots. The passage roof 24 may be directed in a downward direction to assist this preventing bacteria or infectious material from entering the plant pot 10. The passage may provide an air filtering effect which may assist with reduction of infections forming in the plant pot 10.

The drainage apertures 14 may also reduce the potential for dry areas to form in a plant pot 10, as the passages may assist with retention of fluids in the plant pot 10. This may provide a relatively more healthy and/or better growing environment for a plant to inhabit compared to conventional plant pots. The upper portion of the plant pot preferably comprises a rim 26, which may be any predetermined shape, but will generally conform to the shape of the perimeter of the first side wall 12. The rim may provide for an improved structural support which may assist with resisting flexure or deformation during transportation of the plant pot, particularly when the rim is gripped to be moved by hand.

The second reservoir 15 may reduce the frequency in which the plant pot 10 may require fluids, such as water, hormones, or other plant nutrients. This therefore may improve the quality of plant materials being stored in the plant pot 10 and reduce the burden on a person who cares for the plant.

The plant pot 10 may provide a diverse environment similar to what can be found in a natural environment, whereas a lower level pocket of saturated material provides moisture to an upper level by means of natural capillary action. As the plant base medium naturally dries out at the surface of the plant pot 10, the relatively more moist material near to, or in, the second reservoir 15 will propagate or diffuse into the drier region. This does not rely on straws, pipes or wicks as the material is already within itself one body.

It is believed that the buffered region 22 will improve the water retention of the plant pot 10, and may also; minimise nutrient loss, reduce the possibility of disease and stagnation, increase the time required between watering, negate the adverse effects resulting from over-watering and maintain a consistently moist environment in all areas of the pot.

In yet another embodiment, the plant pot may be converted into a conventional full-draining pot by providing further apertures in the base 21 of the second reservoir 15. Optionally, the bevelled edge 30 (see FIG. 8) of the base 21 is provided with said further apertures (not shown). The apertures may be formed by, for example drilling or puncturing a desired location on the plant pot 10. This alteration can also easily be reversed by simply filling the holes with a grommet or a suitable sealing means. Conversely, a conventional plant pot cannot be converted to a plant pot 10 of the present disclosure, as conventional plant pots do not have a passage or more than one reservoir.

Figure 8:
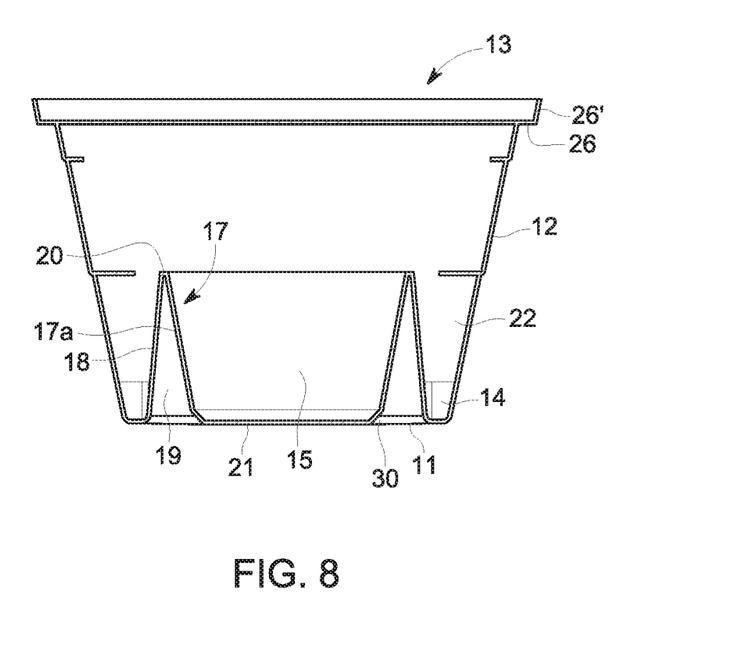
FIG. 8 illustrates a partial cross sectional side view of a second preferred embodiment of a plant pot with a stepped side wall.
Figure 9:
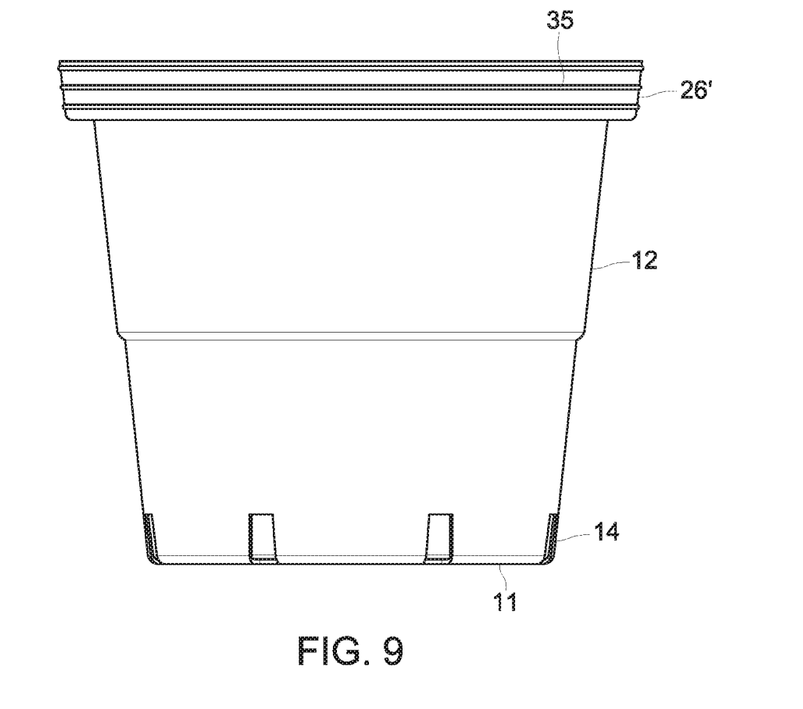
FIG. 9 illustrates a side view of a second preferred embodiment of a plant pot with a plurality of ribs disposed on the rim.
Figure 10:
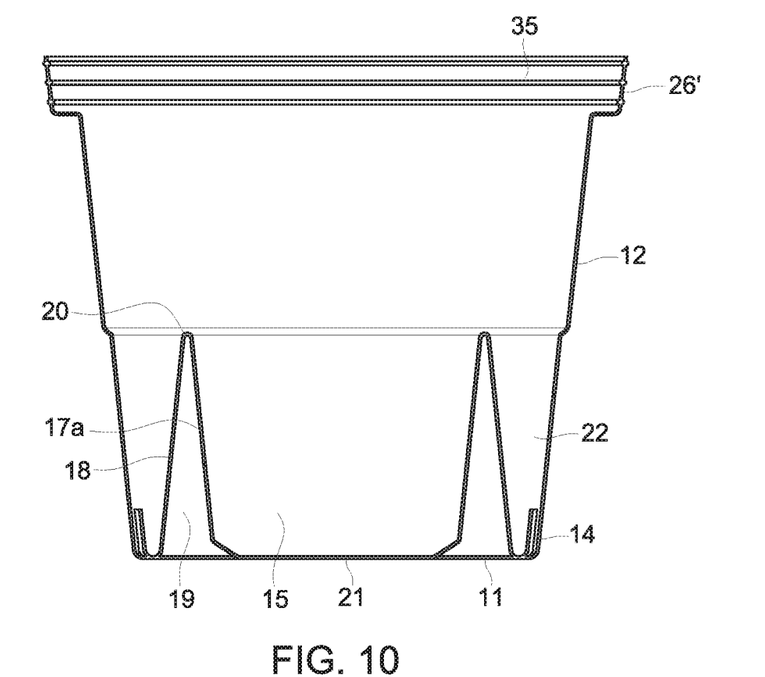
FIG. 10 illustrates a partial cross sectional side view of the second preferred embodiment as depicted in FIG. 9.

As illustrated in FIGS. 8 and 9, the at least one first side wall 12 comprises a rim portion 26. The rim portion 26 may comprise a projection which projects relatively upwardly form a periphery of the rim 26. The up-turned portion of the rim portion 26 is referred to herein as "up-turned rim" 26'. The rim portion 26 may be rounded to reduce stress zones. The rim portion 26 may further comprise ribbing 35 for assisting the a user grip when lifting and transporting the plant pot 10. In yet another embodiment the rim portion 26 may alternatively comprise a down-turned rim 26" project relatively downwardly (see FIG. 5).

The rim portion 26, compared to a conventional down-turned rim, typically does not require additional material to form up-turned rim 26', as the orientation of the rim is merely inverted. The plant pot 10 may be formed from a suitable polymer, such as at least one of; polypropylene, PVC, Nylon, Polystyrene, Polyethylene, LDPE, MDPE, HDPP and HDPE. In one embodiment, the upturned rim 26' may provide for an increased volume of the pot plant.

An indicator may be disposed in the plant pot 10 for to mark a suitable filling point for the plant based material in the plant pot 10. The up-turned rim 26' may further provide for an overall higher side wall 12, which may assist to retain plant based medium, such that when watering or transporting the plant pot 10, the displacement of plant based medium from the plant pot may be reduced compared to a plant pot with a down-turned rim filled at a substantially equal level. The plant pot 10 with an up-turned rim 26 may collect more water and may protect the plant based medium from environmental factors, such as wind. It may be appreciated that the plant based material may be filled above the indicator. Due to the increased volume from the up-turned rim 26', more mulch may be placed in the plant pot 10, which may increase enzymatic activity in the plant based medium.

A plant pot 10 having an up-turned rim 26' allows for visual inspection of the plant pot 10 to determine whether insects or pests are at the rim portion 26. As users generally grip the rim portion 26 to transport the plant pot 10, this may reduce the potential for injuries or bites from insects, such as spiders, as a visual inspection of the rim is provided.

The plant pot 10 may provide for an improved retention of nutrients as nutrients may settle in the second reservoir 15, and may be consumed by a plant retained in the plant pot 10 over time. Preferably, leeching of nutrients from the plant pot will be reduced, as nutrients in the second reservoir will be required to travel a greater distance to be expelled via a drainage aperture 14, compared to that of a conventional full drainage plant pot. These nutrients continue to provide for the plant for a greater length of time than would otherwise be the case with a conventional plant pot for otherwise same would have been leeched away.

Figure 11:
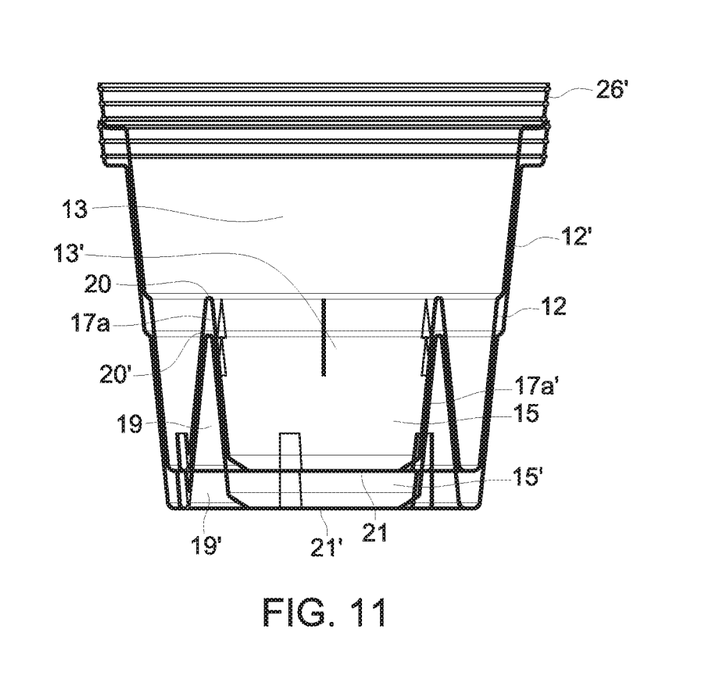
FIG. 11 illustrates a wireframe cross sectional view of multiple second preferred embodiments of the present invention stacked within each other.
Figure 12:
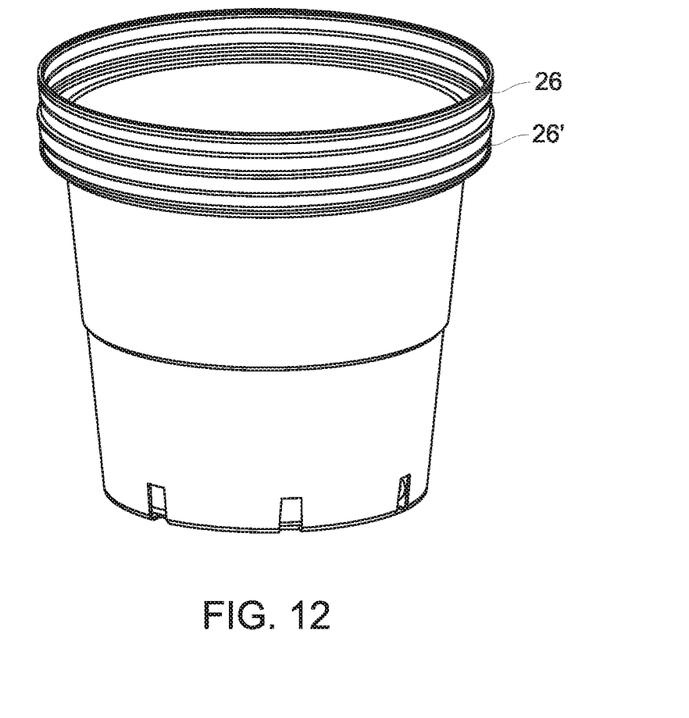
FIG. 12 illustrates perspective view of relating to the second preferred embodiments wherein two plant pots are stacked together.

As illustrated in FIGS. 11 and 12, a first plant pot 10' may be adapted to receive a further plant pot in the first reservoir 13'. As the plant pots 10, 10' will generally have the same shape and dimensions, the first reservoir 13' will generally be adjacent to the first reservoir 13 of the further plant pot, and the second reservoir 15' may receive the second reservoir 15 of the further plant pot 10 therein. Mounting the plant pots inside each other may be referred to as "stacking" or "nesting" plant pots. To facilitate stacking, plant pots 10 may be arranged such that the second reservoir side walls 17a', 18' form a hollow region 19' on the underside of the first plant pot 10 and thereby permitting a second plant pot to fit above the hollow region 19, with the second reservoir side walls 17a, 18 stacked on the first plant pot second reservoir side walls 17a', 18' as shown in FIG. 11. Further, to prevent sticking of multiple plant pots, which is common with stacks of plant pots, the thickness of the material at the underside of the apex 20' of the first plant pot may be increased (relative to the first side wall 12' of the first plant pot 10) compared to the underside of the apex 20 of the second plant pot (relative to the first side wall 12 of the second plant pot 10) to slightly increase the gap between each nested or stacked plant pot and thereby reduce the potential for plant pots to form a pressure seal making unstacking or un-nesting difficult. When nesting, the base 21 of the second plant pot 10 is positioned relatively above the base 21' of the first plant pot 10'.

Increasing the thickness of the underside of the apex 20 may improve the durability of the plant pot and reduce the potential for stress concentration to result in cracking or other undesirable failure of the second side wall 17. In yet a further embodiment, as illustrated in FIG. 11, the internal passage structure of the drainage apertures 14 may be formed with a relatively wider horizontal side 25a, 25b at the base 11 and a relatively more narrow horizontal side 25a, 25b at the top also allows nesting of other similar shaped plant pots 10.

It will be appreciated that the plant pot 10 in the present disclosure may have a moisture gradient with the lower level of the pot having a wetter environment compared to a higher level of the plant pot 10. The wetter environment for the plant root structure may promote root growth and plant vigour, and may also encourage increased enzymatic activity within the plant growth medium. The plant root structure may therefore have more time to access relatively higher levels of nutrients from the reduced leeching of plant nutrients compared to conventional plant pots. As such, the plant pot 10 may require less fertilisation to maintain a healthy level of nutrients in the plant pot.

It will also be appreciated the plant pot 10 may retain more water compared to conventional plant pots, and therefore the plant pot 10 may require less watering.

It will be appreciated that the plant pot 10 may reduce rotting of the plant by minimising the retention of stagnant water in the plant base material. Plant degradation including possible disease and parasitic infestation may be increased if when stagnant water may be exposed to the open air. The buffer zone 22 in the plant pot 10 may prevent water retained in the second reservoir 15 from contact by open air, which may improve the health of the plant.

While the plant pot 10 has been described with reference to a generally cylindrically shaped plant pot 10, the plant pot 10 may be embodied in other forms of plant pots, including pots having a plurality of side walls, or any other predetermined shape. A possible example may include the reservoir being of square or rectangular shape.

The plant pot 10 may be formed by extrusion and/or moulding (molding) processes. Pigments or other additives may be added to impart a desirable property to the plant pot 10, such as fibres to improve abrasion resistance or pigment to colour, dull or shine the plant pot 10.

In yet another embodiment, the second side wall 17 of the second reservoir 15 may have at least one of a; sinusoidal profile, a square profile, a parabolic profile, a polynomial curvature, or any other predetermined profile shape. The second side wall 17 of second reservoir 15 may be in the shape of a ripple, with any desirable amplitude to form the ripple peak (or apex). In some preferred embodiments, each cross section second side wall 17 may form a general triangular shape when viewed from a side.

Although the invention has been described with reference to specific examples, it will be appreciated by those skilled in the art that the invention may be embodied in many other forms, in keeping with the broad principles and the spirit of the invention described herein.

The present invention and the described preferred embodiments specifically include at least one feature that is industrial applicable.

The invention claimed is:

1. A plant pot comprising:
   a first reservoir having a base;
   at least one first side wall extending upwardly from an outer periphery of the base;
   at least one second side wall formed in the first reservoir extending upwardly from the base;
   the at least one second side wall forming a second reservoir in the first reservoir;
   wherein the second reservoir is integrally formed from the base of the first reservoir;
   wherein a buffer region is provided between the first side wall and second side wall such that the second reservoir is spaced away from contact with an open air environment;
   wherein the side wall of the second reservoir is concave to allow for the retention of fluids and saturated potting material, and sinusoidal in profile to encourage tap and lateral root separation; and
   wherein the at least one second reservoir side wall forms a hollow void region on the underside of the plant pot between a base of the second reservoir and base of the buffer region, thereby permitting a second plant pot to fit above the hollow region with the second reservoir side wall of the second plant pot stacked on the second reservoir side wall of the plant pot, the plant pot further comprising at least one drainage aperture.

2. The plant pot of claim 1, wherein the at least one first side wall is stepped.

3. The plant pot of claim 2, wherein the at least one second side wall is equal in height to at least one step in the at least one first side wall.

4. The plant pot of claim 1, wherein the at least one first side wall comprises at least one flange above the at least one drainage means.

5. The plant pot according to claim 4, wherein the at least one flange extends from the at least one first side wall in a direction towards the at least one second side wall.

6. The plant pot according to claim 1, wherein the at least one first side wall comprises a rim portion.

7. The plant pot according to claim 6, wherein the rim portion comprises a projection which projects relatively upwardly.

8. The plant pot according to claim 1, wherein the at least one second side wall is formed by at least one deformation of the base.

9. The plant pot according to claim 8, wherein the at least one deformation is sinusoidal in profile.

10. A plant pot comprising:
    a first reservoir having a base;
    at least one first side wall extending upwardly from an outer periphery of the base;
    in which the at least one first side wall is stepped;
    at least one second side wall formed in the first reservoir extending upwardly from the base;
    the at least one second side wall forming a second reservoir in the first reservoir;
    wherein the second reservoir is integrally formed from the base of the first reservoir, in which the height of the second side wall is equal in height to a step of the stepped at least one first side wall;
    wherein a buffer region is provided between the first side wall and second side wall such that the second reservoir is spaced away from contact with an open air environment;
    wherein the side wall of the second reservoir is concave to allow for the retention of fluids and saturated potting material, and sinusoidal in profile to encourage tap and lateral root separation, and
    wherein the at least one second reservoir side wall forms a hollow void region on the underside of the plant pot between a base of the second reservoir and base of the buffer region, thereby permitting a second plant pot to fit above the hollow region with the second reservoir side wall of the second plant pot stacked on the second reservoir side wall of the plant pot, the plant pot further comprising at least one drainage aperture.

11. The plant pot according to claim 10, wherein the at least one first side wall further comprises a rim portion.

12. The plant pot according to claim 10, wherein the rim projects relatively outwardly from the at least one first side wall.

13. The plant pot according to claim 10, wherein a first reservoir drainage means is formed in the first reservoir.

14. The plant pot according to claim 13, wherein at least one of the first reservoir drainage means is adapted to be plugged.

15. The plant pot according to claim 10, wherein the at least one second side wall is formed by deformation of the base.

* * * * *